(12) United States Patent
Nazir et al.

(10) Patent No.: US 11,935,031 B2
(45) Date of Patent: Mar. 19, 2024

(54) TWO-DIMENSIONAL CODE COMPATIBILITY SYSTEM

(71) Applicant: Visa International Service Association, San Francisco, CA (US)

(72) Inventors: Sirajuddin Nazir, San Francisco, CA (US); Yuexi Chen, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 17/410,294

(22) Filed: Aug. 24, 2021

(65) Prior Publication Data

US 2022/0188803 A1   Jun. 16, 2022

Related U.S. Application Data

(60) Provisional application No. 63/125,824, filed on Dec. 15, 2020.

(51) Int. Cl.
*G06Q 20/32*     (2012.01)
*G06K 7/14*      (2006.01)
*G06Q 20/36*     (2012.01)

(52) U.S. Cl.
CPC ....... *G06Q 20/3274* (2013.01); *G06K 7/1413* (2013.01); *G06K 7/1417* (2013.01); *G06Q 20/367* (2013.01)

(58) Field of Classification Search
None
See application file for complete search history.

(56) References Cited

U.S. PATENT DOCUMENTS 8,459,560 B1 *  6/2013  Mineo-Goggin ................... G06Q 20/3223
                                                          235/487
10,210,498 B1 *  2/2019  Meyyappan ....... G06Q 30/0264
(Continued)

OTHER PUBLICATIONS

"Merchant Processing, Comptroller's Handbook, Aug. 13-18, 2014" (Year: 2014).*
(Continued)

*Primary Examiner* — Kito R Robinson
*Assistant Examiner* — Toan Duc Bui
(74) *Attorney, Agent, or Firm* — Kilpatrick Townsend & Stockton LLP (57) ABSTRACT

A method is disclosed. The method comprises receiving, in an interaction by a switch computer from a second device, data associated with a machine readable code generated by a first application on a first device and provided by a first device to a second application on the second device. The method also includes determining, by the switch computer, a first server computer associated with a first application, transmitting the data associated with the machine readable code and the interaction data to the first server computer, which processes the data associated with the machine readable code and the interaction data, determining, by the switch computer, a second server computer associated with the second application, and transmitting, by the switch computer, a communication to the second server computer. The communication informs the second server computer that the first server computer processed the data associated with the machine readable code and the interaction data.

20 Claims, 6 Drawing Sheets

(56) References Cited

U.S. PATENT DOCUMENTS

| | | | |
|---|---|---|---|
| 10,346,834 B1 | 7/2019 | Kurani et al. | |
| 10,592,888 B1* | 3/2020 | Ellis | G06Q 20/405 |
| 10,803,463 B1* | 10/2020 | Barnum | G06Q 20/3276 |
| 10,880,895 B2* | 12/2020 | Gordaychik | H04W 72/51 |
| 11,530,501 B1* | 12/2022 | Podhajny | D04B 35/04 |
| 11,562,366 B2* | 1/2023 | Barnum | G06Q 20/208 |
| 2011/0264558 A1* | 10/2011 | Alexandrou | G06Q 30/0613 |
| | | | 705/26.41 |
| 2013/0041767 A1* | 2/2013 | Hollander | G06Q 20/387 |
| | | | 705/17 |
| 2016/0321877 A1* | 11/2016 | Baitz | G06K 19/06028 |
| 2017/0053357 A1* | 2/2017 | Bowman | G06F 16/951 |
| 2018/0204206 A1 | 7/2018 | Flurscheim et al. | |
| 2020/0034807 A1* | 1/2020 | Shamai | G06Q 20/38215 |
| 2021/0398114 A1* | 12/2021 | Mossoba | G06Q 20/4014 |
| 2022/0101304 A1* | 3/2022 | Kang | G07G 1/0045 |
| 2022/0121494 A1* | 4/2022 | Proud | G06F 9/5061 |
| 2022/0198426 A1* | 6/2022 | Sivaraman | G06Q 20/22 |
| 2023/0005566 A1* | 1/2023 | Xin | G16B 50/20 |

OTHER PUBLICATIONS

"Bharat QR Code—An Insight", by Rajesh Rengaswamy, 3 pages, (Oct. 2018).

"Alipay Enables QR Interoperability—The New Global Buzzword", https://wwwinfinitcept.com/payment-facilitator, 2 pages.

* cited by examiner

TWO-DIMENSIONAL CODE COMPATIBILITY SYSTEM

CROSS-REFERENCES TO RELATED APPLICATIONS

This application is a non-provisional application of U.S. Patent Application No. 63/125,824, filed on Dec. 15, 2020, which is herein incorporated by reference in its entirety.

BACKGROUND

Interactions such as location access and payment transactions can use two-dimensional machine readable codes such as barcodes. However, a number of problems exist with conventional systems and methods, because two-dimensional machine readable codes produced and serviced by different entities are not often compatible with each other. For example, a machine readable code on one device may not be compatible with machine readable code reading software on another device. As a result, these two devices may not be able to interact at all. Further, even if they could be programmed to interact, such programming would need to be customized for each and every incompatible pair of machine readable code systems.

Embodiments of the invention are directed to addressing these and other problems, individually and collectively.

BRIEF SUMMARY

One embodiment can include a method. The method comprises receiving, in an interaction by a switch computer from a second device, data associated with a machine readable code generated by a first application on a first device and provided by the first device to a second application on the second device, and interaction data originating from the second device, determining, by the switch computer, a first server computer associated with the first application, transmitting the data associated with the machine readable code and the interaction data to the first server computer, which processes the data associated with the machine readable code and the interaction data; determining, by the switch computer, a second server computer associated with the second application; and transmitting, by the switch computer, a communication to the second server computer, which informs the second server computer that the first server computer processed the data associated with the machine readable code and the interaction data.

Another embodiment includes a switch computer. The switch computer comprises a processor, and a non-transitory computer readable medium, comprising instructions, that when executed by the processor, cause the processor to: receive, from a second device, data associated with a machine readable code generated by a first application on a first device and provided by the first device to a second application on the second device, and interaction data originating from the second device; determine, by the switch computer, a first server computer associated with a first application; transmit the data associated with the machine readable code and the interaction data to a first server computer, which processes the data associated with the machine readable code and the interaction data; determine a second server computer associated with the second application; and transmit a communication to the second server computer, which informs the second server computer that the first server computer processed the data associated with the machine readable code and the interaction data.

Further details regarding embodiments of the invention can be found in the Detailed Description and the Figures.

DETAILED DESCRIPTION

Prior to discussing embodiments of the invention, some terms can be described in further detail.

A "user" may include an individual. In some embodiments, a user may be associated with one or more personal accounts on web applications and/or mobile devices. The user may also be referred to as a cardholder, account holder, or consumer in some embodiments.

A "user device" may be any suitable device that can be used by a user. User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component. In other embodiments, a "user device" may be a payment device such as a card with a two-dimensional code.

A "payment device" may include any suitable device that may be used to conduct a financial transaction. The payment device may be a software object, a hardware object, or a physical object. As examples of physical objects, the payment device may comprise a substrate such as a paper or plastic card, and information that is printed, embossed, encoded, or otherwise included at or near a surface of an object. The information printed or encoded may be a two-dimensional code. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Such devices can operate in either a contact or contactless mode.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "transaction processing application" may be a computer program that is used for a specific purpose of facilitating a transaction. Specifically, a transaction processing application may be a digital wallet (e.g., Paytm) installed on a device (e.g., user device) that facilitates a secure wireless digital transaction.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "authorization request message" may be an electronic message that requests authorization for a transaction. In some embodiments, it is sent to a transaction processing server computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a PAN (primary account number or "account number"), a user name, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing server computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant access device (e.g. PA equipment) that indicates approval of the transaction. The code may serve as proof of authorization.

A "payment processing network" may include a network for processing payment transaction. A payment processing network may include data processing subsystems, networks, server computers and operations used to support and deliver authorization services, exception file services, and clearing and settlement services. The payment processing network may be any suitable network able to transmit and receive financial system transaction messages (e.g., ISO 8583 messages), and process transactions. An exemplary payment processing system may include VisaNet™. Payment processing systems such as VisaNet™ are able to process credit card transactions, debit card transactions, and other types of commercial transactions.

"Access data" may include any suitable data that can be used to access a resource or create data that can access a resource. In some embodiments, access data may be account information for a payment account. Account information may include a credential such as a PAN (primary account number). In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

A "quick response (QR) code" may include a two-dimensional array of black and white squares that contains machine-readable data. A QR code may be referred to as a matrix barcode or two-dimensional code. The QR code may be a computer generated code.

"Interaction data" may be any suitable data associated with an interaction between two entities (e.g., two devices). Interaction data can be used to process an interaction. For example, interaction data may include a value such as a transaction amount, a credential such as an account identifier, a device identifier, an interaction identifier, etc. Interaction data could also include the above described access data.

Embodiments of the invention include a switch computer that enables a first transaction processing device and a second transaction processing device to process a transaction using a two-dimensional barcode that is only compatible with one of the devices. Some embodiments can enable a resource provider device (e.g., a merchant computer, a transit operator computer, a secure building access organization computer, etc.) to accept and process a transaction involving an incompatible two-dimensional code produced by a user device.

In embodiments of the invention, a resource provider device (or a transaction processing application on the resource provider device) may be configured to process one or more types of barcodes from one or more transaction processing applications. The resource provider device may be further configured to communicate with a switch computer. The switch computer can process barcodes not supported by the resource provider device.

Upon initiation of a transaction between the resource provider and a user, the resource provider device may receive a barcode from the user. The barcode may be generated by a user device based upon user information (e.g., user's account number, email, etc.) and may be presented by the user device (e.g., via a display of a mobile phone) to the resource provider device. The resource provider device may read the barcode, translate the barcode to retrieve the underlying data, validate the user information, and process the transaction. In conventional systems, if the data associated with the barcode that is presented by the user device is not recognized by the resource provider device, then the transaction is not processed by the resource provider device.

Unlike conventional systems, embodiments of invention enable the resource provider device to process transactions when an incompatible barcode is presented by the user device to the resource provider device. The data associated with the incompatible barcode may be forwarded to the switch computer by the resource provider device. Upon receiving the data associated with the incompatible barcode, the switch computer identifies the format of the incompatible barcode, processes the transaction using the incompatible barcode, and then notifies the resource provider if the transaction was approved or not approved.

Figure 1:
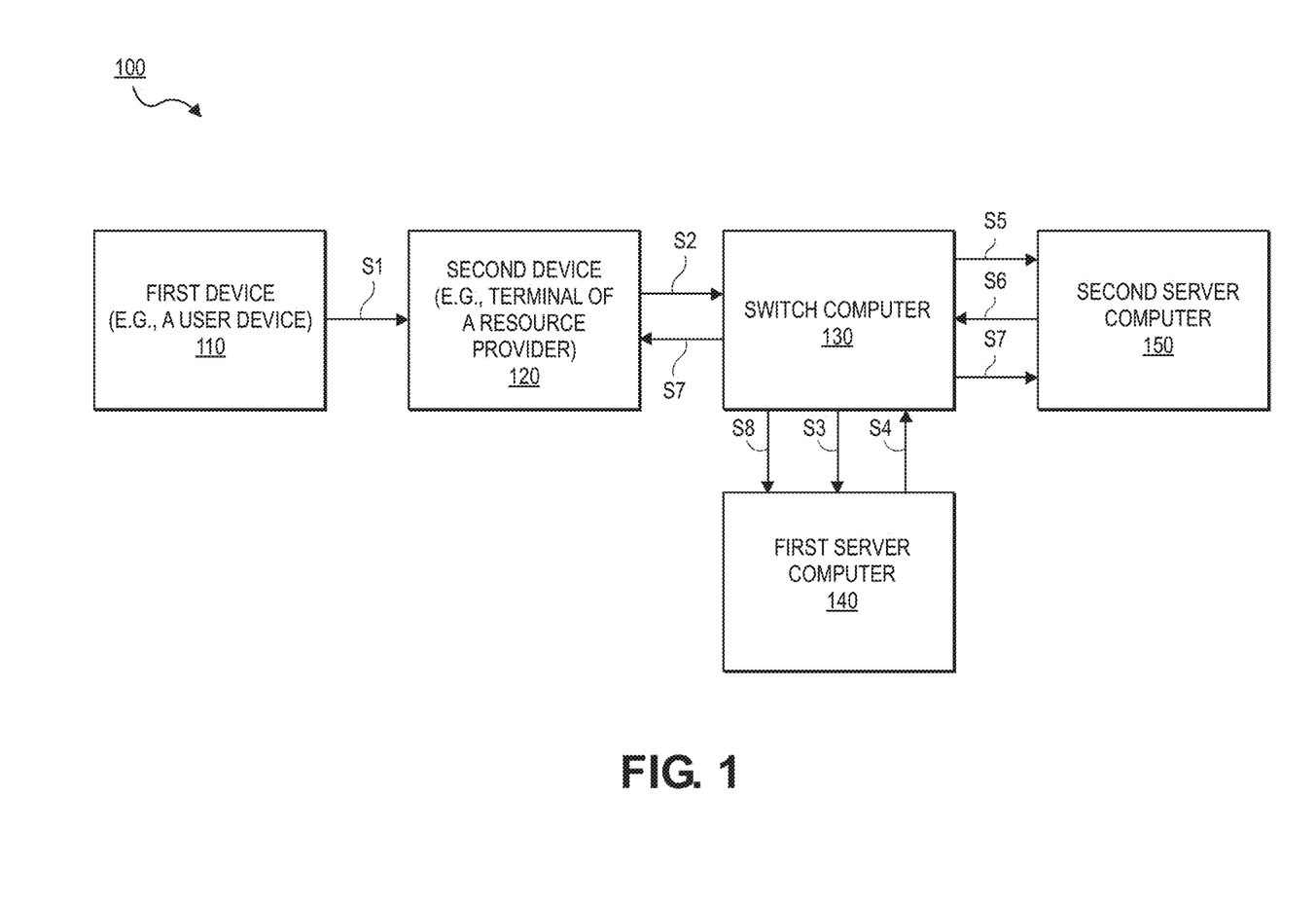
FIG. 1 shows a block diagram of a transaction processing system with a flow diagram according to an embodiment of the invention.

FIG. 1 shows a block diagram of a transaction processing system 100 depicting steps for processing a transaction at a resource provider device using a switch computer, according to an embodiment of the invention. The transaction processing system 100 comprises a first device 110, a second device 120, a switch computer 130, a first server computer 140, and a second server computer 150, as shown in FIG. 1.

The first device 120 may be a user device such as a mobile device. The first device 120 may have a first application such as a first transaction processing application (e.g., a digital wallet application). The first application may generate two-dimensional codes for transactions conducted by the user.

The second device 120 may be a resource provider device. In some embodiments, the second device 120 may be a merchant point of sale (POS) terminal. The second device 120 may include a reader device that can scan two-dimensional codes presented at the merchant POS terminal. In embodiments, the reader device within the second device 120 may include one or more optical scanners, bar code readers, cameras, and/or the like.

The switch computer 130 may be programmed to forward and process messages to and from the first server computer 140 and the second server computer 150. The second device 120 may also be in communication with the switch computer 130. The second device 120 may have a second application such as a second transaction processing application (e.g., a digital wallet application).

The first server computer 140 may be a operated by a first service provider associated with the first transaction processing application on the first device 110. The first service provider can be a digital wallet, a transit provider, a financial institution, that issues payment credentials to user and manages a financial account of the user, etc.

The second server computer 150 may be operated by a second service provider. The second service provider can be the same or different type of service provider as the first service provider.

Each of the components shown in FIG. 1 may be in operative communication with each other. The components in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

A method according to an embodiment of the invention can be described with respect to FIG. 1. Referring to FIG. 1, a user may wish to initiate a transaction to obtain a resource such as a good and/or service offered by a resource provider, access to a secure location, access to secure data, etc. In order to initiate the transaction, the user may initiate an interaction between first device 110 and second device 120.

In some embodiments, as shown in step S1 of FIG. 1, a user may initiate the interaction by presenting a barcode on the first device 110 to a device reader associated with the second device 120. In the case of a payment transaction, prior to presenting the barcode, the user may enter or initiate the entry of one or more transaction details, such as a name, a billing address, and a product selection into a user interface (UI) provided by the second transaction processing application installed on the second device 120.

Upon entry of the transaction details, the user may be prompted to provide a barcode to a reader associated with the second device 120. In some embodiments, the barcode generated by the first device 110 may be scanned by the reader in the second device 120. In some embodiments, the user information such as a primary account number (PAN) or tokenized PAN may be embedded in the barcode read by the second device 120.

In an example embodiment, for a payment transaction, the second device 120 may be configured to perform the functions of a point of sale (POS) terminal. The second device 120 may be a mobile phone, a personal computer (PC), a PDA, a wearable device, and the like. The second device 120 may include a second application such as a second transaction processing application that receives barcode information from a reader device in the second device 120.

In the above implementation, the reader device (e.g., a camera) in the second device 120 scans the barcode (e.g., a QR code) presented by the first device 110. In case of a payment transaction, the barcode may indicate that the user is attempting to use a first transaction processing application (e.g., a digital wallet application) installed on the first device 110 to pay for one or more items sold by the resource provider. The barcode may include encoded and embedded transaction information and/or identification information for the user. In some cases, the transaction information may also include an indication of which payment network, authorizing entity computer, or server computer that is to be used to process the transaction.

In addition, in some embodiments, the barcode may indicate the amount of money that is to be transferred from the user to the resource provider as part of the transaction. The second transaction processing application on the second device 120 may use this information to process the transaction. Alternatively, the second transaction processing application may determine interaction data such as the transaction amount prior to processing the transaction.

In the above embodiment, the barcode that is scanned by the reader (in step S1) may be a QR code that encodes alphabetic characters, text, numbers, double characters or URLs. The QR code may be received by the second transaction processing application within the second device 120. The second transaction processing application may translate the QR code into a text string. The scanned QR code may be in a specific format that is different from a QR code format supported by the second transaction processing application.

In certain implementations, encoded data types within the QR code may be a website URL, an email address, a phone number, and account information. The format of the QR code may include certain characters or delimiters to recognize the different data types within the QR code. For example to recognize the website URL, the QR code may include "http://" characters in front of the name of the URL. Similarly, to recognize email address, the format may require to include "mailto" prior to the email address. In conventional systems, the formatting of barcodes may be preconfigured within the second device 120 (or the second transaction processing application). The second application on the second device 120 can recognize and decode the barcode for processing of the transaction.

In above embodiment, after the second application translates the QR code into a text string, the second application tries to recognize the format of the QR code. If the second application recognizes the format of the QR code and is able to process the QR code, the second application processes the transaction in a traditional manner. The second application may use the account information received in the QR code to route the payment and account details to the appropriate service provider computer to process the transaction.

Alternatively, the second application may not recognize the format of the scanned OR code received in step S1. The second application may not recognize the OR code or support the transaction if the OR code is not in a native format that is configured with the second application.

In step S2 of FIG. 1, upon determining that the OR code is not supported by the second application, the second application sends the translated string of OR code with the transaction information and the identification information to the switch computer 130. The combination of transaction information and identification information may be interaction data. In an example embodiment, transaction information may include an amount of a purchase and other information about the transaction. The identification information may include account information and/or contact information associated with the user.

After receiving the string for QR code and the interaction data, the switch computer 130 may process the string to identify the QR code format. The switch computer 130 may compare the format of the QR code with list of formats supported by the switch computer 130 to determine whether the switch computer 130 can process the transaction. The QR code formats supported by the switch computer 130 may be preconfigured within the switch computer 130. The switch computer 130 may check data types and/or data elements with the data types and/or data elements of the supported formats to determine if it can process the transaction.

In the above embodiment, if the switch computer 130 determines that the format of the QR code is not supported for processing by the switch computer 130, it returns an error message back to the second application. In the above embodiment, if the switch computer determines that it can support and process the transaction, the switch computer 130 identifies the transaction processor associated with the QR code received in step S2. Specifically, the switch computer 130 identifies an authorization entity or server computer associated with the first application. As shown in FIG. 1, the transaction processor associated with the QR code generated by the first application may be the first server computer 140.

The first server computer 140 may be operated by a service provider (e.g., a Paytm® platform) such as an authorizing entity (e.g., an issuer) that can authorize the transaction. In step S3 of FIG. 1, the switch computer 130 communicates with the first server computer 140 to process the transaction and sends an authorization request message to the first server computer 140. The first server computer 140 may receive the authorization request message from the switch computer 130. The first server computer 140 then approves or declines the transaction by determining if an account associated with the user has a sufficient amount of funds.

The first server computer 140 may generate an authorization response message based on this determination. The authorization response message may then be transmitted to the switch computer in step S4 of FIG. 1. The switch computer 130 may complete the transaction with the first server computer 140 based on the authorization response message. In an example embodiment, for a payment transaction, the switch computer 130 may debit the transaction amount from an account associated with the first server computer 140 once the transaction is authorized. In some embodiments, to process the debit transaction, the first server computer 140 may interact with one or more external servers.

After authorization for the transaction amount from the first server computer 140, the switch computer 130 may identify an authorization server entity for the second application installed on the second device 120. As shown in FIG. 1, the switch computer 130 may identify the second server computer 150 to be the service provider computer associated with the second application. The second server computer 150 may be associated with an issuer, which may typically be an entity, such as a financial institution, that manages a financial account of the resource provider for the second device 120 as well as other users (e.g., a WeChat® platform).

In steps S5 and S6 of FIG. 1, after identifying the second server computer 150, the switch computer 130 completes the payment transaction with the second server computer 150. Specifically, the switch computer 130 may credit the transaction amount into an account associated with the resource provider (or merchant). In step S5, the switch computer 130 can inform the second server computer 150 of the credit and the second server computer 150 can respond to that communication.

Once the transaction is processed, a transaction notification that the transaction is completed can provided to the second device 120 by the switch computer 130 in step S7. Also, a transaction log may be created and may be sent to the second server computer 150 in step S7. Similarly, a notification that the transaction is completed and that the transaction log is created can be sent to the first application (to notify the user) by the first server computer 140, after the switch computer 130 provides a transaction completion notification to the first server computer 140 as shown in step S8.

At a later time, the switch computer 130 can then settle the payment by performing a clearing and settlement process between the switch computer 130, the first computer sever 140, and the second server computer 150. That is, actual funds may be moved from the account of the first server computer 140 to the account of the resource provider of the second server computer 150 via the switch computer 150. The switch computer 150 can maintain a ledger of accounts for the first server computer 140 and the second server computer 150 to keep track of amounts owed between these entities.

The switch computer 130 may be part of a processing network computer. The processing network computer may include data processing subsystems, networks, and operations used to support and deliver authorization services, exception file services, and clearing and settlement services.

Figure 2:
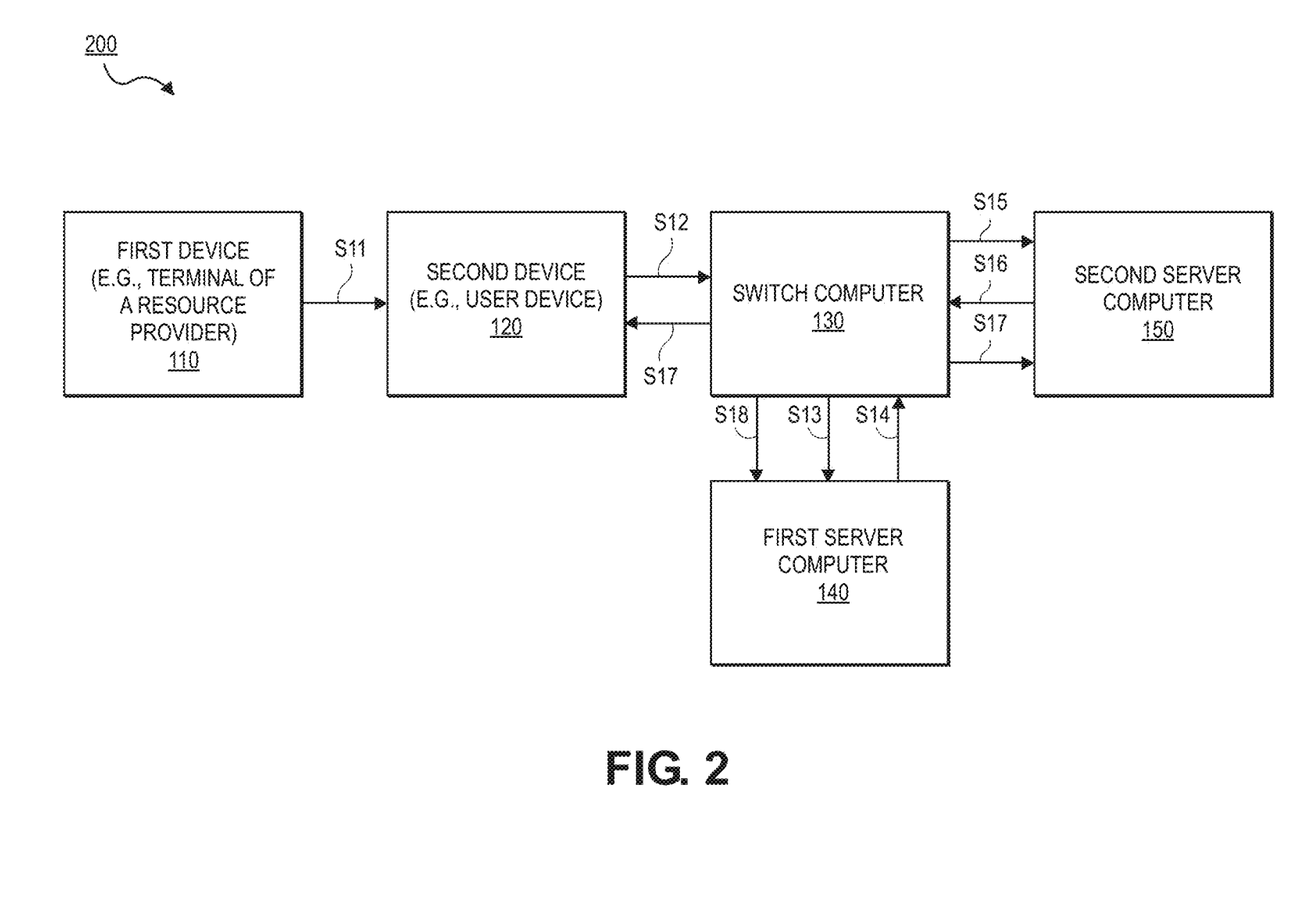
FIG. 2 shows a block diagram of a transaction processing system with a flow diagram according to another embodiment of the invention.

FIG. 2 shows a block diagram of a transaction processing system 200 depicting steps for processing a transaction at a user device using the switch computer, according to an embodiment of the invention. Specifically, steps disclosed in FIG. 2 provide a method for a user's terminal or device to process a transaction using the switch computer 130 where the user device receives a two dimensional code from a resource provider terminal. In this example, the second device 110 may be a user device whereas the first device 120 may be a resource provider device.

At step S11, a user device or the second device 120 may scan a barcode presented by the first device 110 associated with a resource provider. The second device 120 may include a device reader to scan and read the barcode. In some examples, the barcode (or QR code) includes resource provider account information, a first device identifier (e.g., a terminal identifier), and transaction information.

Upon receiving the barcode, the second device 120 or the second application installed on the second device 110 translates the barcode into a text string. After the second application within the second device 120 translates the barcode into a string, the second device 120 tries to recognize the format of the barcode. If the second application is compatible with the first application, and recognizes the format of the barcode and is able to process the barcode, the second application processes the transaction in a conventional manner. For example, the second device 110 may retrieve account information for the user, and the account information received in the barcode, and the transaction information, and may route it directly to the second server computer 150 without passing through the switch computer 130 to process the transaction.

Alternatively, in certain embodiments, the second application on the second device 120 may be incompatible with the first application on the first device 110. The second application on the second device 120 is not able to recognize the format of the scanned barcode from the first device 110. In step S12, in response, the second device 120 may send the translated string of the QR code with interaction data such as account information from the second device 120 to the switch computer 130.

After receiving the string for the barcode including the account information from the second device 120, the switch computer 130 may process or analyze the string to identify the barcode format. The switch computer may compare the format (i.e., a first format) of the bar code with list of formats supported by the switch computer 130. If the switch computer 130 determines that the format is not supported, then it returns an unsupported error message back to the second device 120 and/or the first device 110. Alternatively, the switch computer 130 can determine that the format is supported by identifying a second format in the list of formats that matches with the first format of the received bar code data. The switch computer 130 may then identify the first server computer 130 associated with second format in the list of formats.

In the above embodiment, if the switch computer 130 determines that it can support and process the transaction, the switch computer 130 may send an authorization request message to the first server computer 140, as shown in step S13 of FIG. 2. The first server computer 140 may receive an authorization request message and then approve or deny the transaction by determining if an account associated with the user has a sufficient amount of funds. In this example, the first server computer 140 may be associated with the second application on the second device 120.

The first server computer 140 may generate an authorization response message based on this determination. The authorization response message may then be transmitted to the switch computer 130 in step S14 of FIG. 2. The switch computer 130 may complete the transaction with the first server computer 140, where the first server computer 140 is associated with a first service provider computer. In addition, in an example embodiment, for a payment transaction, the switch computer 130 may debit the transaction amount from an account associated with the first server computer 140.

After authorization for the transaction amount from the first server computer 140, the switch computer 130 may identify a transaction processor associated with the first application installed on the first device 110. As shown in FIG. 1, the switch computer 130 may identify the second server computer 150 to be the service provider computer associated with the first application. The second server computer 150 may be associated with a service provider that manages a financial account of the resource provider for the first device 120.

After identifying the second server computer 150, the switch computer 130 completes the payment transaction with the second server computer 150 in steps S15 and S16 of FIG. 2. Specifically, the switch computer 130 may credit the transaction amount into the account associated with the resource provider (or merchant). The switch computer 130 may inform the second server computer 150 in step S5 and the second server computer 150 may respond to that communication in step S6.

Once the transaction is processed, as shown in step S17, a transaction notification that the transaction is completed is provided to the second server computer 150 (to notify the resource provider) from the switch computer 130. A transaction log may be created and sent to the second server computer 150. A notification that the transaction is completed and that the transaction log was created can be sent to the second device 120 (to notify the user) by the first server computer 140, after the switch computer 130 provides a communication to the first server computer 140 as shown in step S8.

At a later time, the switch computer 130, the first computer server 140, and the second server computer 150 can settle the transaction similar to the manner as described above with respect to the process in FIG. 1.

Figure 3:
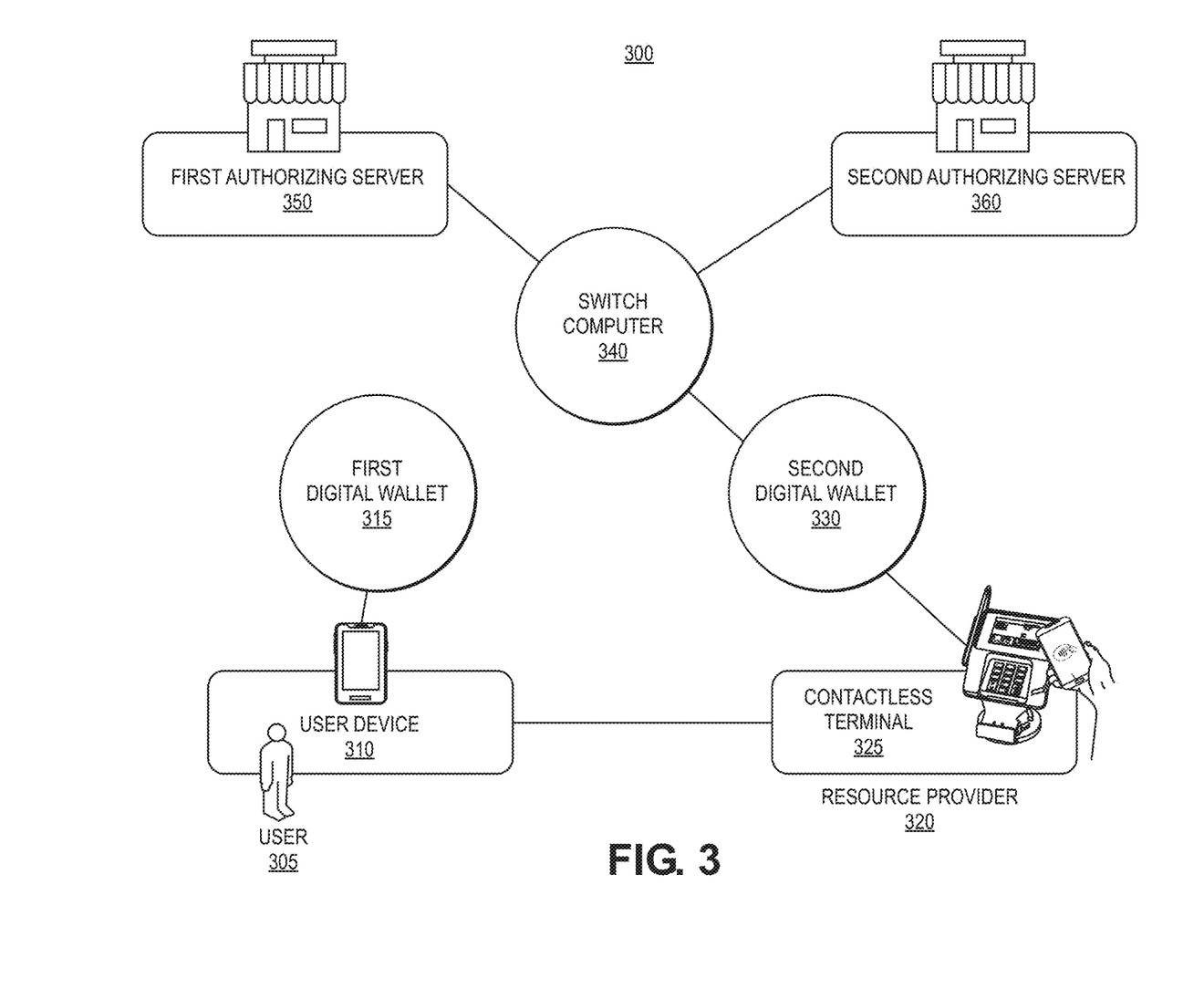
FIG. 3 shows a block diagram of a system according to another embodiment of the invention.

FIG. 3 shows a block diagram of a system 300 may include a user 305, a user device 310 operated by the user 305, first digital wallet 315, resource provider 320, contactless terminal 325 operated by the resource provider 320, second digital wallet 330, switch computer 340, a first authorizing server 350, and a second authorizing server 360.

In some embodiments, the user device 310 may be a mobile device with a first digital wallet 315 installed on the device. The first digital wallet may be a web-based contactless payment applications such as PayPal, AmazonPay, Paytm, etc. A user may use the first digital wallet to make a payment for a service or a product. The first digital wallet application may generate a barcode or QR code to enable the user to make contactless payment.

In some embodiments, a resource provider 320 such as a merchant may use a contactless terminal 325 for accepting payments from users or buyers. The contactless terminal 325 may be a mobile device or a physical point of sale system that includes a barcode scanner. A second digital wallet 330 may be installed on the contactless terminal 325. The second digital wallet 330 may be a web-based payment applications such as PayPal, AmazonPay, Paytm. The second digital wallet 330 may be different from the first digital wallet 315. The second digital wallet 330 may determine and process transaction information (e.g., scanned barcode information, user's account information, product information, etc.) for a payment transaction.

In certain implementations, to purchase a product or an item, the user 305 may present a QR code generated by the first digital wallet 315 on the user device 310 in front of the scanner at that contactless terminal 325. The QR code may be scanned by the scanner and transmitted to the second digital wallet 330 to process the transaction.

In some implementations, the second digital wallet 330 may translate the QR code into text string as discussed above. The second digital wallet 330 can then determine whether the format of the QR code can be supported. Upon determining that the QR code cannot be processed by the second digital wallet 330, the second digital wallet 330 sends the data associated with the QR code along with transaction information to the switch computer 340.

In some implementations, the switch computer 340 may accept and process the QR code and transaction information. After receiving the string for QR code and the transaction information, the switch computer 340 may process the string to identify the QR code format. The switch computer 340 may compare the format of the QR code with list of formats supported by the switch computer 340. Upon determining that the QR code format is supported by the switch computer 340, the switch computer 340 identifies authorizing entities associated with both the first digital wallet 315 and the second digital wallet 330.

In some implementations, the authorizing entity associated with the first digital wallet 315 may operate the first authorizing server 350 and the authorizing entity associated with the second digital wallet 360 may operate the second authorizing server 360. The switch computer 340 may communicate with both first and second authorizing servers (350 and 360) for obtaining authorizations for the payment transaction and for settling funds for the purchase made by the user 305.

Figure 4:
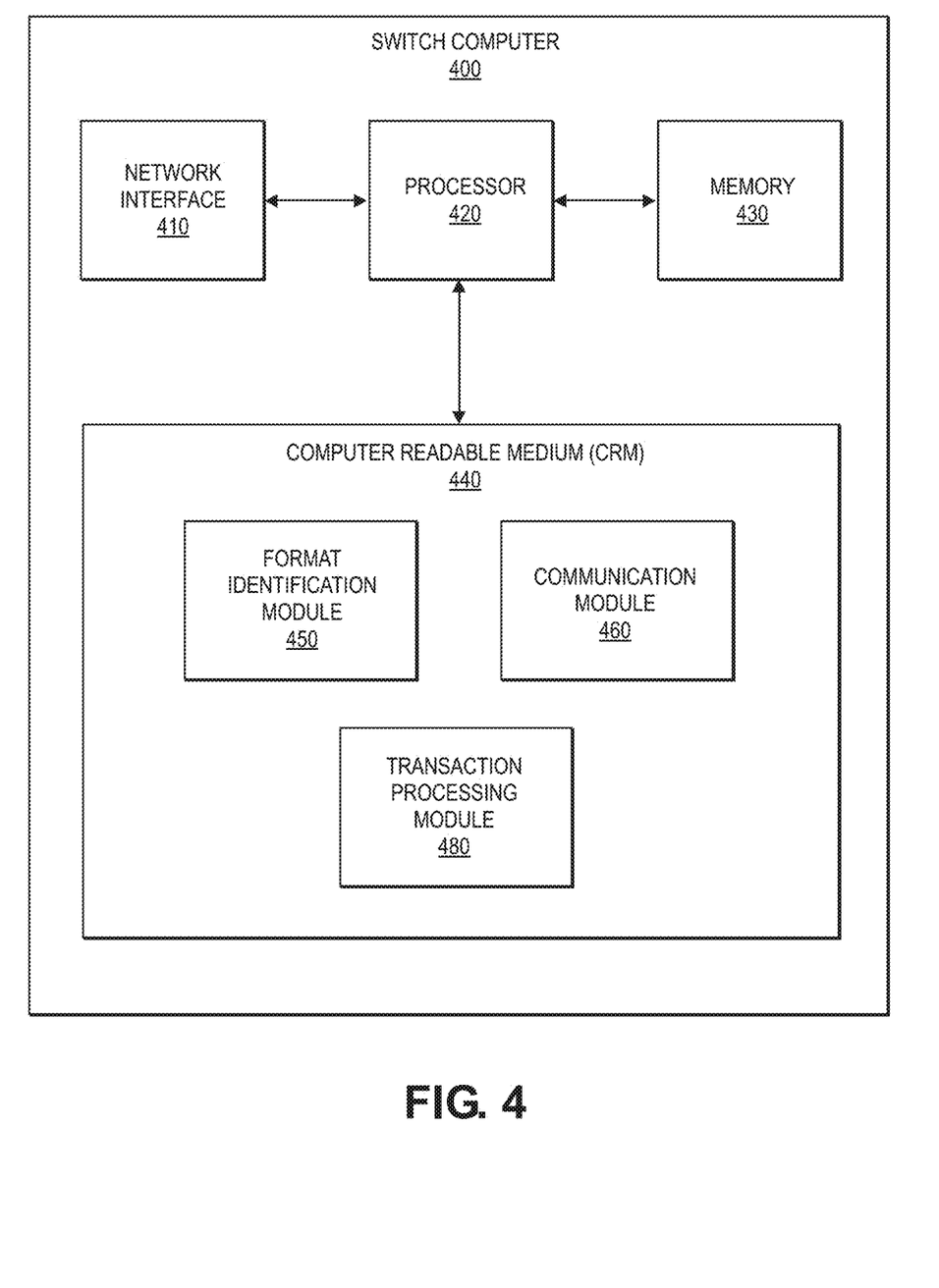
FIG. 4 shows a block diagram of an exemplary switch computer.

FIG. 4 shows a block diagram of an exemplary switch computer, according to one embodiment of the invention. The switch computer 400 may comprise a processor 420, a memory 430, and a network interface 410.

The memory 430 can store a plurality of applications executable by the processor 420. The network interface 410 can be coupled to the processor 410 and enable the processor 410 to communicate with one or more external devices. The network interface 410 can be configurable to select between multiple communication protocols to communicate with the external device. Specifically, the network interface 410 enables the processor 420 to communicate with one or more applications associated with the external device.

The switch computer 400 may also include a computer readable medium (CRM) 440 comprising code, executable by the processor 208 for implementing methods using embodiments of the invention.

In some embodiments, the CRM 440 may comprise a format identification module 450, communication module 460, and transaction processing module 480. The format identification module 450 may receive one or more strings and transaction information from external devices. The format identification module 450 may further identify the format of the string by comparing the format with a list of formats supported by the switch computer 400. The list of formats may be stored within the memory 430. If the format of the string matches one of the formats from the list, the format identification module 450 may instruct the transaction processing module 480 to process the transaction.

The transaction processing module 480 may receive notification from the format identification module 450 about the matching of the format. The module 480 then identifies one or more authorization servers associated with the transaction. The module communicates with the one or more authorization servers to process and complete the transaction.

The transaction processing module 480 may also include a table which associates authorizing entities and their computers and network addresses, with their machine readable code formats.

The communication module 460 may send and receive messages to one or more transaction processing applications (e.g., 315, 330) which use the switch computer 440 for processing transactions. The communication module 460 may also communicate with authorization entities or server computers for the transaction processing applications. The transaction processing module 480 and the format identification module 450 may communicate to external entities or devices using the communication module 460.

In some embodiments, the computer readable medium 440 may comprise instructions that can cause the processor 420 to receive, from a second device, data associated with a machine readable code generated by a first application on a first device and provided by a first device to a second application on the second device, and interaction data originating from the second device; determine, by the switch computer, a first server computer associated with a first application; transmit the data associated with the machine readable code and the interaction data to a first server computer, which processes the data associated with the machine readable code and the interaction data; determine a second server computer associated with the second application; and transmit a communication to the second server computer, which informs the second server computer that the first server computer processed the data associated with the machine readable code and the interaction data.

The computer readable medium 440 may further comprise instructions that cause the processor 420 to determine a first format of the data associated with the machine readable code generated by the first application on the first device, access a list of formats associated with a plurality of machine readable codes, compare the first format of the data with the list of formats, determine that the first format of the machine readable code matches a second format from the list of formats, and identify the first server computer associated with the second format.

Figure 5:
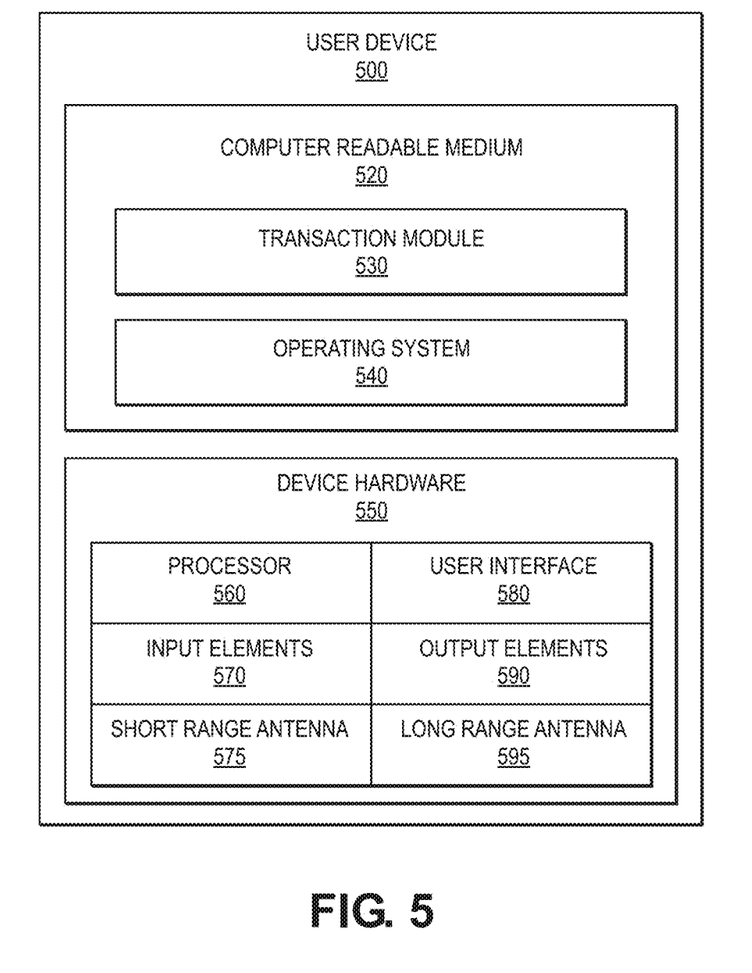
FIG. 5 shows a block diagram of an exemplary user device.

FIG. 5 shows a block diagram of an exemplary user device 400 that can be used in embodiments of the invention. The user device may primarily be used to store access credentials of a consumer, and may be a phone, a tablet, a payment card, and/or any other suitable device configured for communication with a device reader connected to a resource provider computer. The user device 400 can be an example of the first device in FIG. 1 or the second device in FIG. 2.

The user device 500 may comprise a computer readable medium 520, which can be in the form of (or may be included in) a memory element that stores data and can be in any suitable form (e.g., microSD chip, SIM card, or other type of memory element). The computer readable medium 520 may store a transaction module 530 and an operating system 540 for the device. The transaction module may be a transaction processing application (e.g., 315 of FIG. 3). The transaction module 530 may begin a transaction at the request of a user or in response to an interaction (e.g., tapping, inserting, or swiping) with a device reader. The transaction module 530 may, in conjunction with a processor 560, generate machine readable codes such as two-dimensional barcodes from data. The transaction module 530 may be similar to the first application on the first device 110 in FIG. 1.

The user device 500 may further include some device hardware 550, comprising at least: a processor 560, a user interface 580, input elements 570, and/or output elements 590. The device hardware 550 may also include a short range antenna 575 and a long range antenna 595 for communicating with a wireless network and/or other devices. All elements in the device hardware 550 are operatively coupled, enabling mutual communication and data transfer.

Figure 6:
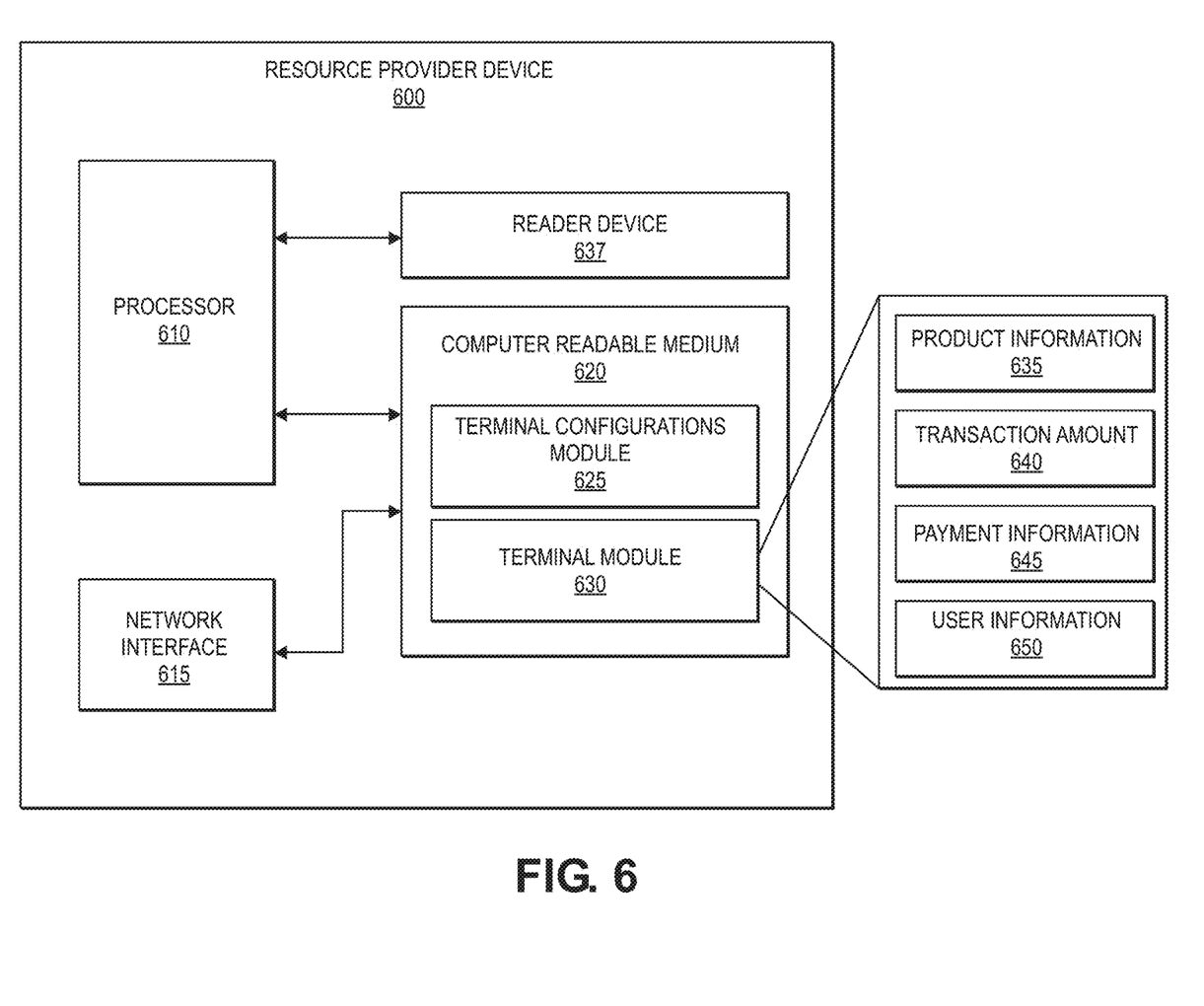
FIG. 6 shows block diagram of an exemplary resource provider device.

FIG. 6 shows a block diagram of an exemplary resource provider device 600 in accordance with embodiments of the invention. The resource provider device can be an example of the second device in FIG. 1 or the first device in FIG. 2. The resource provider device 600 may include a processor 610 coupled to a non-transitory computer readable medium 620 and a network interface 615 for receiving and transmitting messages to other entities (e.g., a device reader or a user device). In some embodiments, the network interface 615 may additionally receive and transmit messages to and from the switch computer 400.

The processor 610 may include one or more microprocessors to execute code on the non-transitory computer readable medium 620. The non-transitory computer readable medium 620 may comprise a terminal configuration module 625 and a transaction module 630.

The transaction module 630 may communicate with a reader device 637 (e.g., scanner) that scans the barcode presented by the user of the resource provider. The transaction module 630 may additionally comprise a Web browser that is configured to receive transaction data from a user. The Web browser may consist of a secure user interface that displays product information and a value such as a transaction amount for a selected product(s) when a user initiates a transaction with the transaction. The web browser may also allow a user to provide a scanned barcode for transaction. The non-transitory computer readable medium 620 may further include a set of libraries or software tools that can facilitate communication between the transaction module and a device reader, and components outside the resource provider device 600. The transaction module 630 may, in conjunction with the processor 610, generate barcodes based upon certain data. The transaction module 630 may be similar to the second application on the second device 120 in FIG. 1.

In an example embodiment, a transaction module 630 may be associated with a physical or virtual terminal for a resource provider. In case of payment processing for a service or product, the transaction module 630 may receive user information through web browser and/or barcode presented by the user at the user device. The transaction module may determine information such as product or service information 635, user information 650, a transaction amount information 640, and payment information 645.

Embodiments of the invention have a number of technical advantages. As noted by the above examples, embodiments of the invention enable interoperability between different transaction processing systems without requiring significant modifications to the transaction processing systems. The solution solves interoperability issue of incompatible barcodes in a frictionless and scalable manner. Accordingly, the solution enables a user or consumer using a specific payment system to make payment to a resource provider or third party that is not using the same payment system.

Although the above-described embodiments pertain to payment transactions, it is understood that embodiments of the invention are not limited thereto. For example, in some embodiments, the user may operate a first device, and a resource provider may operate a second device. The second device can be an access terminal that allows a user to access a secure location, secure data in a database, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, in an interaction by a switch computer from a second device, data associated with a machine readable code generated by a first application on a first device and provided by the first device to a second application on the second device, and interaction data originating from the second device, wherein the second device sends, to the switch computer, the data associated with the machine readable code and the interaction data, upon determining that the machine readable code is not compatible with the second application;
   upon receiving the data associated with the machine readable code and the interaction data, determining, by the switch computer, whether a format of the data associated with the machine readable code is supportable by the switch computer, by determining if the format of the data matches one of formats included in a list of formats supportable by the switch computer or does not match any format in the list of formats, wherein the formats included in the list of formats are associated with a plurality of machine readable codes;

in response to the determining that the format of the data associated with the machine readable code matches the one of formats in the list of formats, determining, by the switch computer, a first server computer associated with the first application, which-that generated the machine readable code on the first device, wherein the determining the first server computer associated with the first application comprises:

comparing the format of the data associated with the machine readable code with the formats in the list of formats, based on the comparing, determining that the format of the data matches the one of formats in the list of formats, and identifying that the first server computer is associated with the one of formats;

transmitting the data associated with the machine readable code and the interaction data to the first server computer, which processes the data associated with the machine readable code and the interaction data;

determining, by the switch computer, a second server computer associated with the second application; and transmitting, by the switch computer, a communication to the second server computer, which informs the second server computer that the first server computer processed the data associated with the machine readable code and the interaction data.

2. The method of claim 1, wherein the machine readable code is at least one of a two-dimensional code, a barcode, and a QR code.

3. The method of claim 1, wherein the first device is a mobile phone of a user and the second device is an access device at a resource provider.

4. The method of claim 3, wherein the interaction data comprises a value and an interaction identifier.

5. The method of claim 1, wherein the first device is an access device of a first user and the second device is a mobile phone of a second user.

6. The method of claim 5, wherein the interaction data comprises an access token.

7. The method of claim 1, wherein the second device is an access terminal associated with a resource provider.

8. The method of claim 1, wherein the second device sends the data associated with the machine readable code and the interaction data to the switch computer instead of directly to the first server computer or the second server computer.

9. The method of claim 1, wherein the second device is a contactless terminal that allows access to a secure location.

10. The method of claim 1, wherein the determining whether the format of the data associated with the machine readable code is supportable by the switch computer further comprises:

accessing the list of formats associated with the plurality of machine readable codes.

11. The method of claim 1, wherein the format of the data is associated with a string or a sequence of characters.

12. The method of claim 10, wherein the determining whether the format of the data associated with the machine readable code is supportable by the switch computer further comprises determining that the format of the data associated with the machine readable code is not supportable by the switch computer by determining that the format of the data does not match any format in the list of formats; and wherein the method further comprises:

in response to the determining that the format of the data associated with the machine readable code is not supportable by the switch computer, notifying, by the switch computer, the second device that the machine readable code is not supportable by the switch computer.

13. The method of claim 1, further comprising:

subsequent to the transmitting the data associated with the machine readable code and the interaction data to the first server computer, performing, by the first server computer, operations of:

analyzing the data associated with the machine readable code and the interaction data;

processing a transaction associated with the data and the interaction data; and notifying the switch computer about the processing of the transaction.

14. The method of claim 13, wherein the machine readable code is a QR code.

15. The method of claim 1, further comprising:

prior to the receiving by the switch computer the data associated with the machine readable code, receiving, by the second device, the data associated with the machine readable code generated by the first application on the first device;

analyzing, by the second device, the data associated with the machine readable code; and determining, by the second device, that the format of the data associated with the machine readable code is not supported by the second device.

16. A switch computer comprising:

a processor; and a non-transitory computer readable medium, comprising instructions, that when executed by the processor, cause the processor to:

receive, from a second device, data associated with a machine readable code generated by a first application on a first device and provided by the first device to a second application on the second device, and interaction data originating from the second device, upon determining by the second device that the machine readable code is not compatible with the second application;

upon receiving the data associated with the machine readable code and the interaction data, determine whether a format of the data associated with the machine readable code is supportable by the switch computer, by determining if the format of the data matches one of formats included in a list of formats supportable by the switch computer or does not match any format in the list of formats, wherein the formats included in the list of formats are associated with a plurality of machine readable codes;

in response to the determining that the format of the data associated with the machine readable code matches the one of formats in the list of formats, determine a first server computer associated with the first application that generated the machine readable code on the first device by comparing the format of the data associated with the machine readable code with the formats in the list of formats, based on the comparing, determining that the format of the data matches the one of formats in the list of formats, and identifying that the first server computer is associated with the one of formats;

transmit the data associated with the machine readable code and the interaction data to the first server computer, which processes the data associated with the machine readable code and the interaction data;

determine a second server computer associated with the second application; and transmit a communication to the second server computer, which informs the second server computer that the first server computer processed the data associated with the machine readable code and the interaction data.

17. The switch computer of claim 16, wherein the second device determines that the machine readable code generated by the first application on the first device is not compatible with the second application and sends the data associated with the machine readable code and the interaction data to the switch computer.

18. The switch computer of claim 16, wherein, in the determining whether the format of the data associated with the machine readable code is supportable by the switch computer, the processor is configured to:

access the list of formats associated with the plurality of machine readable codes.

19. The switch computer of claim 16, wherein the format of the data is associated with a string or a sequence of characters.

20. The switch computer of claim 18, wherein, in the determining whether the format of the data associated with the machine readable code is supportable by the switch computer, the processor is configured to:

determine that the format of the data associated with the machine readable code is not supportable by the switch computer by determining that the format of the machine readable code does not match any format in the list of formats; and in response to the determining that the format of the data associated with the machine readable code is not supportable by the switch computer, notify the second device that the machine readable code is not compatible.

* * * * *

UNITED STATES PATENT AND TRADEMARK OFFICE
CERTIFICATE OF CORRECTION

PATENT NO. : 11,935,031 B2
APPLICATION NO. : 17/410294
DATED : March 19, 2024
INVENTOR(S) : Sirajuddin Nazir and Yuexi Chen Page 1 of 1

It is certified that error appears in the above-identified patent and that said Letters Patent is hereby corrected as shown below:

In the Claims

In Claim 1, Column 15, Line 11, please remove "which-that generated" and insert -- which generated --

Signed and Sealed this
Twenty-third Day of July, 2024

Katherine Kelly Vidal
*Director of the United States Patent and Trademark Office*